United States Patent [19]

Huynh-Tran

[11] Patent Number: 5,130,200
[45] Date of Patent: Jul. 14, 1992

[54] ARTICLES COATED WITH PVC PLASTISOLS

[75] Inventor: Truc-Chi Huynh-Tran, Burtonsville, Md.

[73] Assignee: W. R. Grace & Co.-Conn., New York, N.Y.

[21] Appl. No.: 695,678

[22] Filed: May 6, 1991

Related U.S. Application Data

[62] Division of Ser. No. 552,963, Jul. 12, 1990, Pat. No. 5,032,432.

[51] Int. Cl.$^5$ .............................................. B32B 27/38
[52] U.S. Cl. .................................. 428/414; 428/416; 428/418; 523/455; 523/457; 523/461
[58] Field of Search ................ 427/386, 409; 428/414, 428/416, 418; 523/455, 457, 461

[56] References Cited

U.S. PATENT DOCUMENTS

| | | | |
|---|---|---|---|
| 4,533,524 | 8/1985 | Burba et al. | 427/386 X |
| 4,824,700 | 4/1989 | Wozniak | 427/409 X |

*Primary Examiner*—Michael Lusignan
*Attorney, Agent, or Firm*—Valerie E. Looper; Steven T. Trinker

[57] ABSTRACT

Poly(vinyl chloride) plastisol compositions modified with epoxy and acid anhydrides can be painted wet-on-wet with acid catalyzed, high solids enamel paints, followed by curing at 120° C. or lower, to give strongly adherent products on electrodeposition coatings and dry, tack-free painted surface. The compositions are also stabilized by the addition of an imide, which provides storage stability at 40° C. for more than three days.

18 Claims, No Drawings

ARTICLES COATED WITH PVC PLASTISOLS

This is a divisions of U.S. application, now U.S. application Ser. No. 552,963, filed Jul. 12, 1990, now U.S. Pat. No. 5,032,432.

FIELD OF THE INVENTION

The invention relates to low temperature cure poly(vinyl chloride) plastisols with improved adhesion and their uses, e.g., as automotive sealants or coatings.

SUMMARY OF THE INVENTION

The present invention describes filled PVC plastisol compositions modified with acidic adhesion improvers comprising an epoxy resin, an acid anhydride, with or without an imide. The said compositions can be heat cured at temperatures of 100° C. to 120° C., preferentially 120° C., for 30 minutes to give cured materials with excellent adhesion to electrodeposition coatings.

Moreover, the uncured products can be painted (wet-on-wet) with acid catalyzed, high solids enamel paints, and then subsequently cured to result in a smooth, dry and tack-free surface while retaining good adhesion on the electrodeposition coatings. Also the cured products can of course be painted wet-on-dry.

In one embodiment, the modified PVC plastisol compositions are also storage stabilized with the incorporation of an imide. The cured products can be used as sealants, adhesives or coatings.

OBJECTS OF THE INVENTION

One objective of the invention is to develop adhesion promoters for PVC plastisols cured at low temperatures (e.g., 120° C. or lower) with good adhesion to electrodeposition coatings.

Another object of the invention is to develop acidic adhesion improvers for PVC plastisols that will not interfere with the paint curing and hence, be paintable wet-on-wet with acid catalyzed, high solids, enamel paints to give cured products with dry, smooth surface.

Still another feature of the invention is to produce PVC plastisol compositions that are storage stable at 40° C. or higher for 3 days or longer.

Yet another object of the invention is to prepare PVC plastisol compositions useful as automotive seam sealers with good adhesion to electrodeposition coatings.

BACKGROUND OF THE INVENTION

Poly(vinylchloride) (PVC) plastisols (which typically consist of a mixture of poly(vinyl chloride) powder, plasticizers, fillers, and additives) are widely used as automotive seam sealers or protective underbody coatings. They are generally cured at 140° C. or higher but often do not adhere well to electrodeposition coatings (E coats).

Polyamidoamines have been described in the prior art to serve as excellent adhesion improvers for PVC plastisols on various substrates. The development of polyamidoamine adhesion promoters for PVC plastisols and their uses in conjunction with or as adducts with epoxies, isocyanates, or Schiff's bases have been the subjects of several patents: U.S. Pat. No. 4,146,520 (1979); U.S. Pat. No. 4,440,900 (1984); U.S. Pat. No. 4,533,524 (1985); and U.S. Pat. No. 4,673,710 (1980).

At cure temperatures of 140° C. or higher, the polyamidoamines can generally be added at low concentration (typically less than 0.5 weight percent) to achieve both adhesion and wet-on-wet paintability without any paint tack. However, at lower cure temperatures, i.e., 120° C. or lower, a higher level of the polyamidoamine adhesion promoter is needed to achieve adhesion. This, however, tends to lead to a significant degree of paint tack due to incomplete paint curing on the plastisol surface. The paint tackiness is attributed to the complexation of the acid catalysts commonly used in high solids, enamel paints with the basic polyamidoamine adhesion promoters which subsequently deactivate the acid catalysts in the paints.

Other materials have also been described in the literature as adhesion improvers for PVC plastisols. U.S. Pat. No. 4,151,317 cited the use of adducts of Schiff's bases with diisocyanates as adhesion promoters for PVC plastisols. The use of silane compounds has also been reported as adhesion improvers for PVC plastisols such as in U.S. Pat. No. 4,268,548 and U.S. Pat. No. 4,540,731. However, these materials are generally basic and hence cannot be used with the acid catalyzed, high solids, enamel paints.

Diligent attempts have been made in recent years to develop PVC plastisol compositions curable at 120° C. or lower while retaining good adhesion properties and wet-on-wet paintability. The reasons are twofold: (a) energy savings at 120° C. cure as compared to 140° C.; and (b) the conversion to acid catalyzed, high solids enamel paints cure at 120° C. or lower in the automotive industry. Accordingly, there is a definite demand for PVC plastisols that can be painted wet-on-wet with these new paints and then cured at 120° C. or lower to result in a good non-tacky paint finish while retaining good adhesion to the substrate. The PVC plastisol compositions described in the present invention meet these requirements.

Chem. Abs. 68 (4):13705n, "*Poly(vinyl chloride) Plastisols,*" (Matsubara), discloses epoxidized plasticizers for chloroethylene polymers, crosslinked with isobutyric anhydride and methylsuccinic anhydride and methylsuccinic anhydride for mechanical improvement.

Chem. Abs. 78 (16):98554s, "*Fluidizing Agents for Plastisols,*" (Szilagyi and Arfiche), describes a mixture of PVC plastisol, dioctyl phthalate and tetrapropenyl succinic anhydride with "improved heat stability and low viscosity."

Chem. Abs. 92 (4):23407b, "*Setting of Epoxy Resins by Complexes based on Maleic Anhydride and N-Vinyl Monomers,*" (Vashevko et al.), describes a complex of maleic anhydride with N-vinyl succinimide, used in thermosetting compositions of epoxy resins. It was claimed that resin viscosity was reduced and storage life increased from 24 hours to 30 days.

Chem. Abs. 101 (8): 56095f, "*Vinyl Chloride Polymer Plastisols,*" (Eroskey) describes PVC plastisol with "small amounts of epoxy resins and anhydride curing agents" for good abrasion resistance.

Chem. Abs. 105 (2): 8054c, "*Chemical Strengthening of Plastisols*" (Krejci, et al.) describes PVC plastisols modified with isophorone diamine, methyltetrahydrophthalic anhydride and 3 percent epoxy resin.

Several patents describe various adhesion promoters or improvers for PVC plastisols (some have already been noted):

U.S. Pat. No. 4,146,520, Bierworth et al (1979), a polymerized fatty acid plus polyalkylene amine.

U.S. Pat. No. 4,151,317, Burba et al (1979), adduct formed between an isocyanate and a Schiff base.

U.S. Pat. No. 4,268,548, Burba et al (1981), azomethine/silane compound.

U.S. Pat. No. 4,440,900, Burba et al (1984), condensation product of a polymerized fatty acid, a polycarboxylic acid, and a polyalkylene polyamine.

U.S. Pat. No. 4,673,710, Burba et al (1987), condensation product formed between a polyaminoamide and a carboxylic acid or ester.

European Pat. Appln. EP 171850 (1986) describes polyaminoamide adhesion promoters made from polymerized unsaturated fatty acids and piperazine.

However, none of the above articles describe the particular use of epoxy resin and acid anhydride with PVC plastisols as a coating on anything, and indeed, not to enhance the adhesion of PVC to electrodeposition coatings, and of course not to affect wet-on-wet paintability with high solids, enamel paints or to produce 40° C. storage stable compositions with the addition of an imide. In this invention, the properties mentioned above have been attained.

DETAILED DESCRIPTION OF THE INVENTION

In general, the plastisol compositions described in this invention comprise the following:
(a) a poly(vinyl chloride) homopolymer or copolymer
(b) a mixture of plasticizers
(c) fillers
(d) additives
(e) an epoxy resin or mixture of epoxy resins
(f) an acid anhydride or mixture of anhydrides
(g) an imide (optional for storage stability)

The proportions of materials that are useful in the compositions in accordance with this invention are set forth in Table 1.

TABLE I

| Component | Parts by Weight | |
|---|---|---|
| | Broad Range | Preferred Range |
| PVC homo- or copolymer | 5-200 | 15-70 |
| Plasticizer | 1-400 | 15-80 |
| Filler | 0-500 | 30-90 |
| Epoxy resin | 1-400 | 3-60 |
| Acid Anhydride | 0.1-200 | 0.1-30 |
| Imide | 0-300 | 0.1-70 |

All of the above components will be discussed in detail, having regard to their uses in the invention process.

As indicated above, as a broad class, PVC plastisols containing anhydride and epoxy compounds are not novel (Matsubara, Eroskey, Krejci, supra); however, so far as can be determined, none of these PVC-epoxy-anhydride compositions has ever before been used to coat a substrate, whether or not followed by painting with high solids enamel paints.

My invention thus presents several novel aspects:
(1) A PVC plastisol material modified with an epoxy resin and an acid anhydride that, upon heating, at relatively low temperatures, particularly at 120° C., strongly adheres to substrates such as electrodeposition coatings.
(2) That material, when painted with high solids, enamel paints, followed by curing, results in a dry, tack-free surface.
(3) Such product is useful in the automotive industry as seam sealers where both thermal energy and time are at a premium.
(4) The disclosed compositions can also be storage stabilized at 40° C. for more than three days, or at ambient temperatures for more than two months with the addition of an imide.

Thus, in a broad sense any filled PVC plastisol containing an epoxy resin and an anhydride will work in my coating process, and in a narrow sense a specific subgenus of such plastisols as set out in Table II is believed novel per se and is preferred.

My invention thus encompasses:
(1) Coating processes.
(2) Articles prepared using the said coating processes.
(3) A novel class of PVC plastisols, with and without imide storage stabilizer.

The PVC Plastisol

By conventional definition a poly(vinyl chloride) (PVC) plastisol is comprised of a mixture of a PVC homopolymer or copolymer with a plasticizer. Both PVC homopolymers and copolymers having molecular weights ranging from 60,000 to 200,000 are applicable in this invention. Commonly used PVC copolymers are vinyl chloride-vinyl acetate copolymers. Other comonomers with PVC include: vinylidene chloride, acrylonitrile, diethyl maleate, maleic anhydride, ethylene, propylene and other ester monomers. Polymers other than PVC may also be incorporated into the formulations to improve other performance. These include, but are not limited to, poly(methyl methacrylate), styrene-butadiene rubber or any other thermoplasts.

A wide variety of plasticizers is available to formulate the plastisol. All conventional plasticizers commonly used in PVC plastisol formulations are applicable in the present invention. These include: the phthaates, adipates, benzoates, azelates, carbonates, trimellitates, phosphates, citrates, stearates, sebacates, glutarates, glycerol esters, glycol esters, butyrates, oleates, alkyds, polymeric esters, epoxidized oils, epoxy tallates, amide-esters, sulfonamides or terpenes.

The PVC plastisols as used in this invention are formulated in the conventional way with inert fillers, extenders, rheological additives or heat stabilizers. Examples of fillers include calcium carbonate, calcium silicate, talc, clay, calcium sulfate, calcium oxide, magnesium oxide, titanium oxide, zinc oxide, diatomaceous earth, molecular sieves or others commonly used in PVC plastisol formulations. Rheological additives can be silica based thixotropes or clay derivatives. By filled PVC plastisols, it is meant herein, PVC homopolymer or copolymer plus plasticizer and fillers or additives in conventional proportions, typically 20-50 weight percent of each ingredient.

The Epoxy Resin

The type of epoxy resin used herein contemplates any of the conventional saturated or unsaturated, aromatic, aliphatic, cycloaliphatic and heterocyclic compounds containing the epoxide group, i.e.;

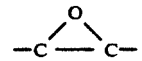

They can be monomeric, dimeric, oligomeric or polymeric epoxies.

Examples of aromatic epoxy resins include, for example, the glycidyl ether derivatives of dihydric phenols such as bisphenol-A, bisphenol-F, resorcinol, hydroquinone and the like. Commercially available epoxy resins of the above type are some of Shell Co's "EPON" resins such as Epon 828, Epon 826, or DOW Chem. Co.'s Dow Epoxy Resins DER 332, DER 324, DER 325 or DER 331; or Ciba-Geigy's Araldite 6010; or the polyglycidyl ether of phenol-formaldehyde novolac resins such as DOW Epoxy Novolacs DEN 431 or DEN 438.

Other suitable commercially available epoxies include the cyclyaliphatic epoxy resins such as Union Carbide's ERL-4221 or Ciba-Geigy's CY 179 (3,4-epoxycyclohexyl-methyl-3,4-epoxycyclohexane carboxylate), Union Carbide's ERL-4299 (Bis(3,4-Epoxy cyclohexylmethyl)adipate), Union Carbide's ERL-4206 (Vinylcyclohexene dioxide), Union Carbide's ERL-4234 (2-(3,4-Epoxycyclohexyl-5,5-spiro-3,4-epoxy)cyclohexane-meta-dioxane) or Ciba-Geigy's CY 184 (Diglycidyl ester of hexahydrophthalic acid).

Other applicable epoxy resins are the acyclic aliphatic epoxies such as epoxidized linseed oil, epoxidized soybean oil or epoxidized diene polymers such as epoxidized polybutadiene.

The Anhydride

Anhydrides useful herein include alicylic, aliphatic, cycloaliphatic, aromatic and polyanhydrides or mixtures thereof. Examples of operable alicyclic anhydrides include, but are not limited to, succinic anhydride, maleic anhydride, citraconic anhydride, itaconic anhydride, alkenyl anhydride, dodecenylsuccinic anhydride, tricarballic anhydride. Cycloaliphatic anhydrides applicable in this invention include: hexahydrophthalic anhydride, methylhexahydrophthalic anhydride, tetrahydrophthalic anhydride, methyltetrahydrophthalic anhydride, linoleic acid adduct of maleic anhydride, maleic anhydride adduct of methylcyclopentatiene, and alkylated endoalkylene tetrahydrophthalic anhydride.

Useful aromatic anhydrides include, but are not limited to, phthalic anhydride, pyromellitic anhydride, and benzophenonetetracarboxylic dianhydride.

Polyanhydrides such as polyadipic polyanhydride, polyazelaic polyanhydride, and polysebacic polyanhydride are also applicable.

Anhydride containing copolymers such as styrene-maleic anhydride copolymer, maleic anhydride-vinyl ether copolymer or maleic anhydride copolymer with octadecene-1 can also be used.

The examples provided below will give a better understanding of the present invention and, by no means should they limit the scope of this invention. The compositions of several formulations are presented in Examples 1–4 along with the control formulation in Examples 5 and 6 which are modified with polyamidoamines for comparison.

| Materials | Weight % |
|---|---|
| Example 1 | |
| Epoxidized linseed oil | 17 |
| 1,2,4,5-Benzentetracarboxylic dianhydride | 8.5 |
| Diundecyl phthalate | 27 |
| PVC copolymer (5 wt. % vinyl acetate) | 22 |
| Calcium carbonate | 35.5 |
| Example 2 | |
| Bisphenol-A epoxy resin diluted with about 15 wt. % of a $C_{12}$–$C_{14}$ aliphatic glycidyl ether | 7 |
| Maleic anhydride | 8.5 |
| Diisononyl phthalate | 17 |
| PVC copolymer (5 wt. % vinyl acetate) | 22 |
| Calcium carbonate | 35.5 |
| Example 3 | |
| Cycloaliphatic Epoxy Resin, Diglycidyl Ester of Hexahydrophthalic Acid | 12.5 |
| Maleic anhydride | 5 |
| Diisodecyl phthalate | 25 |
| PVC homopolymer | 25 |
| Calcium carbonate | 32.5 |
| Example 4 | |
| Epoxidized Linseed Oil | 17 |
| 1,2,4,5-Benzenetetracarboxylic dianhydride | 4 |
| Diundecyl phthalate | 17 |
| PVC copolymer (5 wt. % vinyl acetate | 22 |
| Calcium carbonate | 40 |
| Example 5 | |
| PVC copolymer (5 wt. % vinyl acetate) | 30 |
| Dioctyl phthalate | 30 |
| Calcium carbonate | 39.3 |
| Polyamidoamine | 0.8 |
| Example 6 | |
| PVC copolymer (5 wt. % vinyl acetate) | 30 |
| Dioctyl phthalate | 30 |
| Calcium carbonate | 39.7 |
| Polyamidoamine | 0.3 |

The formulations can be processed through conventional mixing procedures such as, in this case, passing the materials through a three-roll mill. After being homogeneously mixed, the samples were then applied on electrocoated (E-coat) panels, painted wet-on-wet with high solids, enamel paints, and then heated at 120° C. for 30 minutes.

The materials from Examples 1–4 exhibit excellent adhesion to the E-coat substrates and the painted surfaces are smooth and dry without any paint tack. On the other hand, the cured material from Example 5, although it gave excellent adhesion to the E-coat substrate, exhibited a very tacky surface. While the painted surface of Example 6 was not tacky, its adhesion on the E-coat was poor.

The Substrate

The compositions in the instant invention work best on steel or other ferrous substrates, previously electrocoated. Such materials are used in large quantities in the auto assembly lines and their associated paint facilities since these electrodeposition coated surfaces prevent the corrosion of steel surfaces in car bodies.

Storage Stabilization

In a preferred embodiment, the storage stability and the shelf-life of the PVC plastisol compositions modified with the epoxy resin and acid anhydride can be significantly improved by the addition of an imide in the formulations without exerting any detrimental effect on the excellent properties contributed by the use of the epoxy resin and the acid anhydride, e.g., adhesion, low temperature curability and dry, non-tacky paint finish.

The imide of this embodiment has the following general structure:

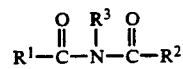

where $R^1$ and $R^2$ are independently aliphatic, cycloaliphatic, or aromatic or may be joined in a ring. $R^3$ can be —H, —OH, alkyl (1–4 carbons), vinyl or alkali metals.

Suitable imide stabilizers operable in this instant invention include succinimide, N-hydroxysuccinimide, M-methyl-succinimide, N-methyl succinimide, N-vinyl-succinimide, maleimide, phthalimide, potassium phthalimide, 1,8-naphthalimide, and the like.

The imide can be incorporated into the PVC plastisol control formulation (i.e., PVC/plasticizer/filler/epoxy resin/acid anhydride) at a level of about 0.025–50 percent by weight, preferably from 0.1–30 percent, and even more preferably about 4–20 percent by weight, based on the control formulation plus the imide. An amount of about 5 percent is particularly useful.

The following examples will illustrate this embodiment of the invention.

| Materials | Weight % |
|---|---|
| Example 7 | |
| Epoxy Resin of Example 2 | 2.7 |
| Succinic Anhydride | 1.8 |
| Succinimide | 4.5 |
| Diisononyl Phthalate | 24 |
| PVC Homopolymer | 18 |
| Calcium Carbonate | 49 |
| Example 8 | |
| Maleic anhydride | 1.71 |
| Polyadipic polyanhydride | 0.30 |
| Succinimide | 5.0 |
| Epoxy Resin of Example 2 | 3.0 |
| Diisodecyl phthalate | 28.84 |
| PVC copolymer (5 wt. % vinyl acetate) | 10 |
| PVC homopolymer | 8 |
| Calcium oxide | 2.82 |
| Calcium carbonate | 40.33 |
| Example 9 | |
| Phthalate mixture, 50% diisononyl-phthalate and 50% diisononyl phthalate | 20 |
| Succinimide | 4.9 |
| Polyadipic polyanhydride | 0.4 |
| Calcium oxide | 2 |
| Calcium carbonate | 38 |
| PVC copolymer (5 Wt. % vinyl acetate) | 25 |
| N-ethyl o/p-toluenesulfonamide | 5 |
| Epoxy Resin of Example 2 | 3 |
| Maleic anhydride | 1.7 |

The above formulations were mixed through a three-roll mill, applied to electrodeposition coated panels, painted wet-on-wet with high solids, enamel paints and then cured at 120° C. for 30 minutes. The resulting painted surfaces are smooth and dry. The samples in Examples 7, 8 and 9 gave bond shear adhesion strength of 14.5, 20.4 and 32.5 kg/cm², after 120° C./30 minutes cure, respectively, compared to 4–5 kg/cm² for a sample unmodified with the epoxy resin, acid anhydride and imide.

The formulations in Examples 7, 8 and 9 are also storage stable at 43° C. for more than 3 days with minimal viscosity change, and have a shelf-life at room temperature of more than two months, compared to samples without succinimide, which gelled after only 1–2 days of storage at 43° C.

As above mentioned, part of my invention is a new class of PVC epoxy-anhydride plastisols, described as follows:

TABLE II

| Component | Parts by Weight | |
|---|---|---|
| | Broad Range | Preferred Range |
| PVC homo- or co-polymer | 5–200 | 15–70 |
| Plasticizer | 1–400 | 15–80 |
| Filler | 0–500 | 30–90 |
| Epoxy compound of the group (a) bisphenol-A epoxy resins; (b) cycloaliphatic epoxy resins; or (c) epoxidized linseed oil | 1–400 | 3–60 |
| Anhydride of the group maleic anhydride, 1,2,4,5-benzenetetracarboxylic di-anhydride, succinic anhydride or polyadipic polyanhydride | 0.1–200 | 0.1–30 |
| Imide | 0–300 | 0.1–70 |

Articles

Use of my process results in novel articles:
(1) Substrate coated with composition of Table I or Table II, with or without an imide.
(2) The coated substrate of (1), wherein the coating is cured at 100–120° C.;
(3) The coated substrate of (2), further coated with a high solids enamel, cured at 100°–120° C.
(4) The coated substrate of (1), further coated with high solids enamel wet-on-wet.
(5) The coated substrate of (4), cured at 100°–120° C.

I claim:

1. An article comprising a substrate coated with a first coating of
   (1) composition comprising effective film-forming amounts of poly(vinyl chloride) polymer or co-polymer, plasticizer, epoxy resin, anhydride, and filler, and
   (2) second coating of acid-catalyzed enamel, applied wet-on-wet.

2. The article according to claim 1 wherein the coatings are cured simultaneously at 100°–120° C. and the enamel surface is smooth, dry, and tack free, with good adhesion to the substrate.

3. The article according to claim 1 wherein the substrate is electrodeposition coated steel.

4. An article according to claim 1 wherein the composition in (1) comprises, in parts by weight,
   (i) poly(vinyl chloride) homopolymer or copolymer, 5 to 200 parts;
   (ii) plasticizer, 1–400 parts;
   (iii) epoxy resin, 1–400 parts, selected from the group consisting of:
      (a) bis phenol-A epoxy resin diluted with about 15 wt. % $C_{12}$–$C_{14}$ aliphatic glycidyl ether,
      (b) cycloaliphatic epoxy resins, and
      (c) epoxidized linseed oil;
   (iv) anhydride, 0.1–200 parts, selected from the group consisting of maleic anhydride, 1,2,4,5-benzenetetracarboxylic dianhydride, succinic anhydride, or polyadipic polyanhydride;
   (v) filler, 0–500 parts; and
   (vi) imide, 0–300 parts, wherein said imide has a structure

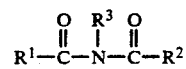

wherein $R^1$ and $R^2$ are independently aliphatic, cycloaliphatic, or aromatic or may be joined in a ring and $R^3$ can be —H, —OH, alkyl (1–4 carbons), vinyl or alkali metal.

5. The article according to claim 4, wherein the composition in (1) comprises
   (i) poly(vinyl chloride) homopolymer or copolymer, 15 to 709 parts;
   (ii) plasticizer, 15–80 parts;
   (iii) epoxy resin, 3–60 parts;
   (iv) anhydride, 0.1–30 parts; and
   (v) filler, 0.1–70 parts.

6. The article according to claim 4, wherein the composition in (1) comprises epoxidized triglyceride, about 17 weight percent; 1,2,4,5,-benzenetctracarboxylic dianhydride, about 8.5 weight percent; diundecyl phthalate, about 17 percent by weight; poly(vinyl chloride) copolymer containing 5 weight percent; vinyl acetate, about 22 weight percent; and calcium carbonate, about 35.5 weight percent.

7. The article according to claim 4, wherein the composition in (1) comprises bisphenol-A epoxy resin diluted with from 5–20 percent by weight of a $C_{12}$–$C_{14}$ aliphatic glycidyl ether, about 7 weight percent; maleic anhydride, about 8.5 percent; diisononyl phthalate, about 27 weight percent; poly(vinyl)chloride) copolymer with 5 weight percent vinyl acetate, about 22 weight percent; and calcium carbonate, about 35.5 weight percent.

8. The article according to claim 4 wherein the composition in (1) comprises diglycidyl ester of hexahydrophthalic acid, about 12.5 weight percent; maleic anhydride, about 5 weight percent; diisodecyl phthalate, about 25 weight percent; poly(vinyl chloride) homopolymer, about 25 weight percent; and calcium carbonate, about 32.5 weight percent.

9. The article according to claim 4 wherein the composition in (1) comprises epoxidized linseed oil, about 27 weight percent; 1,2,4,5-benzenetetracarboxylic dianhydride, about 4 weight percent; diundecyl phthalate, about 17 weight percent; poly(vinyl chloride) copolymer with 5 weight percent vinyl acetate; and calcium carbonate, about 40 weight percent.

10. The article according to claim 9, wherein the composition in (1) comprises a bisphenol-A epoxy resin diluted with 5–20 weight percent of a $C_{12}$–$C_{14}$ aliphatic glycidyl ether, about 2.7 weight percent; succinic anhydride, about 1.8 weight percent; succinimide, about 4.5 weight percent; diisononyl phthalate, about 24 weight percent; poly(vinyl chloride) homopolymer or copolymer with 5 weight percent vinyl acetate, about 18 weight percent; and calcium carbonate, about 49 weight percent.

11. The article according to claim 9, wherein the composition in (1) comprises maleic anhydride, about 1.7 weight percent; succinimide, about 5 weight percent; polyadipic polyanhydride, about 0.3 weight percent; a bisphenol-a epoxy resin diluted with 5–20 weight percent of a $C_{12}$–$C_{14}$ aliphatic glycidyl ether, about 3 weight percent; diisodecyl phthalate, about 28 weight percent; poly(vinyl chloride) copolymer with 5 weight percent vinyl acetate, about 10 weight percent; poly(vinyl chloride) homopolymer, about 8 weight percent; calcium oxide, about 2.8 weight percent; and calcium carbonate, 40 weight percent.

12. The article according to claim 9, wherein the composition in (1) comprises a bisphenol-A epoxy resin diluted with 5–20 weight percent of a $C_{12}$–$C_{14}$ aliphatic glycidyl ether, about 3 weight percent; succinimide, about 4.5 weight percent; polyadipic polyanhydride, about 0.5 weight percent; maleic anhydride, about 2 weight percent; diisooctyl phthalate, about 25 weight percent; calcium carbonate, about 40 weight percent; and poly(vinyl chloride) copolymer with 5 weight percent vinyl acetate, about 25 weight percent.

13. The article according to claim 9, wherein the composition in (1) comprises a $C_7$–$C_9$ phthalate mixture, about 20 weight percent; succinimide, about 4.9 weight percent; polyadipic polyanhydride, about 0.4 weight percent; calcium oxide, about 2 weight percent; poly(vinyl chloride) copolymer with 5 weight percent vinyl acetate, about 25 weight percent; N-ethyl o/p toluenesulfonamide, about 5 weight percent; a bisphenol-A resin diluted with 5–20 weight percent of a $C_{12}$–$C_{14}$ aliphatic glycidyl ether, about 3 weight percent; and maleic anhydride, about 1.7 weight percent.

14. The composition comprising, in parts by weight,
   (i) poly(vinyl chloride) homopolymer or copolymer, 15–70.
   (ii) plasticizer, 15–80;
   (iii) epoxy compound, 3–60;
   (iv) anhydride, 0.1–30;
   (v) filler, 30–90; and
   (vi) imide, 0.1–70.

15. The composition according to claim 14 wherein the imide (vi) is succinimide.

16. The composition according to claim 14 wherein the composition in (1) containing about 4–20 weight percent imide.

17. The composition according to claim 16 containing about 5 percent succinimide.

18. The composition according to claim 16, storage stable at 43° C. for at least 3 days and at room temperature for at least a month.

* * * * *

UNITED STATES PATENT AND TRADEMARK OFFICE
CERTIFICATE OF CORRECTION

PATENT NO.  : 5,130,200
DATED       : July 14, 1992
INVENTOR(S) : Truc-Chi Huynh-Tran It is certified that error appears in the above-identified patent and that said Letters Patent is hereby corrected as shown below:

Col. 9:
Claim 5, line 8: change "15 to 709" to read --15 to 70--.
Col. 10:
Claim 16, lines 44-45, delete "wherein the composition in (1)".

Signed and Sealed this

Sixth Day of April, 1993

Attest:

STEPHEN G. KUNIN

Attesting Officer    Acting Commissioner of Patents and Trademarks